United States Patent [19]
Ide

[11] Patent Number: 5,135,060
[45] Date of Patent: Aug. 4, 1992

[54] ARTICULATED COUPLING FOR USE WITH A DOWNHOLE DRILLING APPARATUS

[76] Inventor: Russell D. Ide, P.O. Box 744, 641 Arnold Rd., Coventry, R.I. 02816

[21] Appl. No.: 665,487

[22] Filed: Mar. 6, 1991

[51] Int. Cl.$^5$ .............................................. E21B 4/02
[52] U.S. Cl. .................................. 175/107; 403/57; 464/16
[58] Field of Search ............... 175/48, 73, 74, 107; 277/101; 384/193; 403/57; 464/16

[56] References Cited

U.S. PATENT DOCUMENTS

| | | | |
|---|---|---|---|
| Re. 29,626 | 5/1978 | Allen | 241/46.11 |
| 2,915,979 | 12/1959 | Bourke et al. | 103/117 |
| 2,924,180 | 2/1960 | Bourke et al. | 103/117 |
| 3,063,265 | 11/1962 | Schmidt | 64/31 |
| 3,097,609 | 7/1963 | Nechine | 103/117 |
| 3,165,065 | 1/1965 | Stickel | 103/117 |
| 3,216,768 | 11/1965 | Soeding et al. | 302/14 |
| 3,242,694 | 3/1966 | Schmidt | 64/19 |
| 3,664,153 | 5/1972 | Sugahara | 64/31 |
| 3,840,080 | 10/1974 | Berryman | 175/107 |
| 3,877,259 | 4/1975 | Bishop | 64/29 |
| 3,918,821 | 11/1975 | Schlegel et al. | 403/57 |
| 3,938,744 | 2/1976 | Allen | 241/46.11 |
| 4,037,887 | 7/1977 | Germain | 384/193 |
| 4,080,115 | 3/1978 | Sims et al. | 418/48 |
| 4,140,444 | 2/1979 | Allen | 418/48 |
| 4,153,397 | 5/1979 | Allen | 418/48 |
| 4,157,022 | 6/1979 | Crase | 64/32 |
| 4,237,704 | 12/1980 | Varadan | 64/31 |
| 4,256,189 | 3/1981 | Fox et al. | 175/40 |
| 4,300,361 | 11/1981 | Lindenthal et al. | 403/57 |
| 4,311,443 | 1/1982 | Clark et al. | 418/48 |
| 4,329,127 | 5/1982 | Tschirky et al. | 418/48 |
| 4,397,619 | 8/1983 | Alliquander et al. | 418/48 |
| 4,443,165 | 4/1984 | Chanton | 418/48 |
| 4,449,953 | 5/1984 | Nikomarov et al. | 464/19 |
| 4,484,899 | 11/1984 | Haarmann | 464/69 |
| 4,577,704 | 3/1986 | Aumann et al. | 175/107 |
| 4,591,322 | 5/1986 | Ono et al. | 418/48 |
| 4,593,774 | 6/1986 | Lingafelter | 175/107 |
| 4,599,056 | 7/1986 | Crase | 418/48 |
| 4,632,193 | 12/1986 | Geczy | 175/65 |
| 4,636,151 | 1/1987 | Eppink | 418/48 |
| 4,641,717 | 2/1987 | Eppink | 175/74 |
| 4,676,725 | 6/1987 | Eppink | 418/48 |
| 4,679,638 | 7/1987 | Eppink | 175/107 |
| 4,693,325 | 9/1987 | Bodine | 175/55 |
| 4,772,246 | 9/1988 | Wenzel | 464/117 |
| 4,824,258 | 4/1989 | Bodine | 366/118 |
| 4,880,067 | 11/1989 | Jelsma | 175/107 |
| 4,976,655 | 12/1990 | Hebert, Sr. | 464/16 |
| 5,048,622 | 9/1991 | Ide | 175/107 |

FOREIGN PATENT DOCUMENTS

| | | |
|---|---|---|
| 1213742 | 3/1966 | Fed. Rep. of Germany. |
| 1233667 | 2/1967 | Fed. Rep. of Germany. |
| 583166 | 1/1925 | France. |
| 788103 | 10/1935 | France. |
| 1126736 | 11/1984 | U.S.S.R. |
| 2152588 | 8/1985 | United Kingdom. |

*Primary Examiner*—Ramon S. Britts
*Assistant Examiner*—Frank S. Tsay
*Attorney, Agent, or Firm*—Marks & Murase

[57] ABSTRACT

A downhole drilling apparatus which includes a drive train having a downhole motor device and a coupling for permitting bending of the drive shaft to accommodate directional drilling. The coupling includes two distinct portions. The first portion transmits torque only and the second portion transmits thrust only. Thus, the coupling transmits torque and thrust through different portions. This makes it possible to optimize the coupling design to allow bending while still being able to transmit the loads experienced downhole. The downhole motor may be a progressive cavity device, a turbine-type downhole motor or another type of downhole motor such as an electric motor.

44 Claims, 11 Drawing Sheets

ARTICULATED COUPLING FOR USE WITH A DOWNHOLE DRILLING APPARATUS

SUMMARY OF THE INVENTION

This invention relates to an articulated coupling for use with high pressure progressive cavity or turbine driven downhole drilling apparatus, and, more particularly, to an articulated coupling capable of bending up to 5° while transmitting the enormous thrust and torque loads typically experienced down hole especially during directional drilling.

BACKGROUND OF THE INVENTION

This invention relates to a turbine or progressive cavity apparatus, and more particularly to drive trains for downhole drilling devices and especially to such devices used in directional drilling.

One of the most common directional drilling techniques is the use of downhole drilling motors in combination with a bent sub. The bent sub is a section of drill pipe manufactured with a slight angle that is installed in the drill string above the bit. The built-in angle of the sub exerts a side force on the bit and causes it to be deflected from the previous direction of the hole. Bent subs typically provide deflections ranging from near zero to 5°. Thus, the drill shaft must be capable of bending or articulating so that the downhole motor can pass the bend in the drill pipe. Typically, either turbine-type or progressive cavity downhole motors are used. However, it is also possible to use an electric motor in some cases.

The use of turbine-type downhole motors is well known in the art. In this type of equipment, the drill bit is rotated by an axial turbine power unit near the bottom of the hole. The turbo drill is driven by the circulating liquid, i.e., "mud", with which the drill hole is flushed. Since the driving motion is simple rotation, the use of turbine-type downhole motors presents no additional problems for directional drilling.

The use of progressive cavity or downhole motors is similarly well known. These devices have a single shaft in the shape of one or more helix contained within the cavity of a flexible lining of a housing. The generating axis of the helix constitutes the true center of the shaft. This true center of the shaft coincides with its lathe or machine center. Typically, the lined cavity is in the shape of a two or more helices (one more helix than the shaft) with twice the pitch length of the shaft helix. Either the shaft or the housing is secured to prevent rotation; the part remaining unsecured rolls with respect to the secured part. As used herein, rolling means the normal motion of the unsecured part of progressive cavity devices. In so rolling, the shaft and housing form a series of sealed cavities which are 180 degrees apart. As one cavity increases in volume, its counterpart cavity decreases in volume at exactly the same rate. The sum of the two volumes is therefore a constant.

When used as a motor for down hole drilling, the unsecured part or rotor produces a rotor driving motion. The driving motion of the rotor is quite complex in that it is simultaneously rotating and moving transversely with respect to the stator. One complete rotation of the rotor will result in a movement of the rotor from one side of the stator to the other side and back. The true center of the rotor will of course rotate with the rotor. However, in a typical construction, the rotation of the true center of the rotor traces a circle progressing in the opposite direction to the rotation of the rotor, but with the same speed (i.e., reverse orbit). Again, optimum performance is obtained when movement of the rotor is precisely controlled. One complete rotation of the rotor will result in one complete rotation of the true center of the rotor in the opposite direction. Thus, the rotor driving motion is simultaneously a rotation, an oscillation, and a reverse orbit For multi-lobe motors the reverse orbit is a multiple of the rotational speed, e.g., if a three lobe motor is used the reverse orbit is three times as great as the rotational speed.

Examples of progressive cavity motor and pump devices are well known in the art. The construction and operation of such devices may be readily seen in U.S. Pat. No. 3,627,453 to Clark (1971); U.S. Pat. No. 2,028,407 to Moineau (1936); U.S. Pat. No. 1,892,217 to Moineau (1932) and U.S. Pat. No. 4,080,115 to Sims et al. (1978).

The use of progressive cavity motors for directional drilling introduces additional problems. Specifically, despite the simple construction of progressive cavity devices, use of the devices as motors in apparatus has proven difficult. This difficulty results primarily from the failure to provide a drive train capable of handling the complex rotor driving motion (described above) in a durable, reliable and inexpensive manner. Couplings that connect the rotor of progressive cavity motors with the drill must be capable of operating in a contaminated, hostile environment while handling a very high torque and transmitting the rotational output of the rotor without the orbital motion of the rotor.

Attempts have been made to convert the complex rotor motion into rotational motion for driving a drilling shaft. Of the couplings which have been used in progressive cavity devices, the most commercially successful has been a universal joint attached to the driving end of the rotor and connected to a universal joint attached to the driven drill shaft. As is known, such U-joints react or resolve the orbital motion by the sliding of pin members in a universal assembly. Thus, such joints typically include elements which slide relative to one another.

The principle on which the Hooke's type of universal assembly works is illustrated in FIG. 3. The shaft A is formed into a fork or yoke at its end and pivoted between the prongs of this fork is a cross-piece C. The cross-piece C can therefore pivot about the XX relatively to the shaft A. The other shaft B similarly includes a fork or yoke at its end and the other arms of the cross are pivoted between the prongs of this fork. The shaft B can therefore pivot about the axis YY relative to the cross C and, since the latter can pivot about the axis XX relative to the shaft A, the shaft B can assume any angular position relative to shaft A. It follows that if the shafts A and B are supported in bearings with their axes at an angle, then when the shaft A is turned about its axis, the motion is communicated to the shaft B and it turns about its axis; the arms of the cross meanwhile oscillating in the prongs of the forks.

The axes XX and YY intersect at 0 and are perpendicular to one another. The axes of the arms of the cross C are also perpendicular to their respective shafts. The axes of the shafts A and B also intersect at 0, which point is commonly referred to as the "center" of the joint.

Although FIG. 3 shows a specific pivoting connection, it does not matter how the pivoting action is obtained. All that is required is that the shaft B shall be able to pivot independently about two intersecting perpendicular axes such as XX and YY, relatively to shaft A. There are many known constructions for achieving this result.

The single Hooke's type of universal assembly described above suffers from a disadvantage which is obviated in some other forms of the joint. Specifically, when two shafts are connected by a single Hooke's joint and one of these shafts is rotating at an absolutely constant speed, then the other shaft will not rotate at a constant speed but at a speed that is, during two parts of each revolution, slightly greater and, during the other two parts of the revolution, slightly less than the constant speed of the first shaft, i.e., the velocity varies cyclicly. The magnitude of this fluctuation in speed depends on the angle between the axes of the two shafts, being 0 when that angle is 0° but becoming considerable when the angle is large. This disadvantage becomes of practical importance in applications such as downhole drilling when it is important to maintain a constant or substantially constant speed. The disadvantage can be obviated by using two Hooke's joints arranged with an intermediate shaft arranged so that it makes equal angles between the first and second stub shafts and the pivot axes of the intermediate shaft being arranged parallel to each other. The irregularity introduced by one joint is then cancelled out by the equal and opposite irregularity introduced by the second joint.

Attempts to apply universal joints to downhole motors have suffered from several disadvantages, particularly in the area of reliability. The primary reason for this is that the fluids used in progressive cavity drilling apparatus often are or quickly become abrasive. This abrasive fluid flows between the relative moving (sliding) surfaces of the U-joint causing rapid wear.

In the past, there have been attempts to isolate the sliding pivot surfaces of a universal from contaminants or heavy vibrations. Examples of such constructions are shown in U.S. Pat. No. 2,727,370 to Holland; U.S. Pat. No. 3,262,284 to Maxwell-Holroyd; U.S. Pat. No. 3,545,232 to Neese et al.; and U.S. Pat. No. 4,861,314 to Mazziotti. However, in such known cases there is always sliding between the seal and one of the surfaces of the U-joint components. As a result of this sliding, the seal is not truly hermetic and the U-joint components are not perfectly isolated. Thus, the possibility of contamination exists, particularly in a high pressure application such as down hole drilling.

Another type of universal joint assembly for use in downhole motor drives is disclosed in U.S. Pat. No. 4,772,246 to Wenzel. This patent discloses a pressure equalization arrangement which significantly reduces the pressure differential across the seal. As a result, the likelihood of leakage of drilling mud into the universal joint is reduced. Despite the advantages it offers, this construction is complicated and expensive. Further, the U-joint components are not perfectly isolated because the seal is not hermetic. Consequently, there is some possibility of contamination of the U-joint assembly. Thus, while the need to seal, to some extent, the components of a U-joint has been recognized, the need to perfectly isolate these components and a reliable means of achieving this are not known in the prior art.

These problems are addressed in the present inventor's previous patent application Ser. No. 07/540,682 entitled "Progressive Cavity Drive Train With Elastomeric Joint Assembly For Use in Downhole Drilling" filed Jun. 20, 1990 and now allowed; Ser. No. 07/540,692 entitled "Downhole Drilling Apparatus Progressive Cavity Drive Train with Sealed Coupling" filed Jun. 20, 1990 and now allowed; and Ser. No. 07/540,693 entitled "Hermetically Sealed Progressive Cavity Drive Train For Use In Downhole Drilling" filed Jun. 20, 1990 and now allowed.

While a well sealed double universal joint is suitable for use downhole it is not necessarily ideal. There are very specific requirements for the coupling used downhole. An ideal coupling meets this requirement without sacrificing durability. An important factor to consider is that the coupling does not have to be terribly flexible. In normal use the coupling undergoes 3° to 4° deflection and thus, need not deflect more than 5°. Thus, the flexibility offered by universal joints really isn't needed. In some cases a relatively thin shaft, i.e., a flexible shaft, can bend the necessary 5° without a coupling. However, there are other requirements.

Regardless of whether the downhole motor is a turbine-type, a progressive cavity type or another type (e.g., electric) the shaft must bend up to 5° to allow directional drilling. In order to do so, the shaft must be capable of transmitting enormous thrust and torque forces. For example, in a medium sized mud motor, the shaft must be capable of reliably transmitting a thrust load of 20,000 lbs. and a torque of 60,000 inch pounds. Conventional drill shafts are not capable of accommodating such loads for sustained periods. Thus, the drill shaft must be modified to include an articulated coupling which allows bending without sacrificing load carrying ability. The design of such an articulated coupling has presented a number of problems. These problems result from a simple paradox. Specifically, if the coupling on the drill shaft is wide enough to withstand the torque load which must be transmitted, it is too big to bend the necessary 3° to 4°. Conversely, if the drill shaft is thin enough to bend 3° to 4°, it is too thin to withstand the enormous torque load which must be transmitted. In addition, in a progressive cavity motor, the shaft must accommodate the orbiting motion of the rotor. For a turbine drive the coupling would only need to accommodate the bend since there is no offset rotor.

SUMMARY OF THE INVENTION

The present invention obviates the problems associated with known directional drilling devices by providing a drive train including a progressive cavity device or turbine and an articulated coupling which allows the downhole motor to pass the bend in the bent sub. The present invention also relates to such a coupling which also converts the complex motion of the rotor into simple rotation of the drill bit drive shaft. The drive train is inexpensive, reliable and durable in comparison to known directional drilling drive trains.

The present invention also provides an improved drilling apparatus which includes a drill string, a progressive cavity or turbine drive train, and a drill bit. The drive train includes a progressive cavity device or turbine motor and an articulated coupling. The motor is connected to the lower end of the drill string and includes a stator, a rotor within the stator, and means for flowing fluids through the stator to drive the rotor. The turbine includes an axial turbine power unit and means for flowing fluids through the unit to drive a rotor. The articulated coupling has a first stub shaft, a second stub shaft, an intermediate member which includes a thrust transmitting assembly and a torque transmitting assembly. The intermediate member is coupled to the first stub shaft at one end and the second stub shaft at the other end. The intermediate member must be capable of bending or articulating to accommodate directional drilling and, in the case of a progressive cavity motor, to convert the complex rotor motion into rotational drilling motion about an axis displaced from and parallel to said rotor axis. The drill bit has a tubular housing connected to the second end of the second stub shaft for rotation with the second stub shaft.

The drive train of the present invention can also be viewed as including a housing structure, a stator having a longitudinal axis, a rotor having a true center and being located within the stator, first and second stub shafts and an intermediate member coupling the stub shafts through the articulated coupling.

In the case of a progressive cavity drive train, the stator and the rotor have coacting helical lobes in contact with one another at any transverse section. The stator has one more helical lobe than the rotor such that a plurality of cavities are defined between the rotor and the stator. The rotor is adapted to rotate within the stator such that the true center of the rotor orbits the axis of the stator; the orbit has a predetermined radius. The orbit is constant and not subject to change such that the rotor motion can be precisely controlled. The orbit of the rotor causes progression of the cavities in the direction of the axis of the stator.

The intermediate member includes a coupling end assembly at each end. The intermediate shaft is coupled to the first stub shaft at one end and the second stub shaft at the other end in the known fashion such that the first shaft and the second shaft are connected to one another via the articulated coupling.

The first stub shaft has a longitudinal axis and first and second longitudinal ends. The first end of the first stub shaft is connected to and movable with the rotor. The second end of the first stub shaft is connected to a coupling end assembly of the intermediate member.

The second stub shaft has a longitudinal axis which is substantially colinear with the axis of the stator and first and second longitudinal ends. The second stub shaft is supported in the housing so that its longitudinal axis is fixed and the second stub shaft is rotatable about its longitudinal axis. The second end of the second stub shaft is connected to the coupling end assembly of the intermediate member.

By virtue of this construction, the drive train can bend to accommodate directional drilling. Moreover, in the case of a progressive cavity drive train, the first stub shaft can rotate about its axis and orbit about the axis of the second stub shaft at the same time the second stub shaft rotates about its longitudinal axis. In this way, the complex rotor motion is resolved into simple rotation for driving the drill assembly of a downhole drill. In lieu of the progressive cavity device, a turbine or other motor could be used to drive the coupling. In this case, the coupling would provide the flexibility needed to effect directional drilling.

When the coupling is used with a progressive cavity drive train, flow of fluids through the stator cavity produces complex rotor driving motion. The articulated coupling is secured to the end of the rotor projecting from the fluid discharge end of the stator. The coupling converts or resolves the rolling of the rotor into a rotational motion substantially about a single axis at the same speed.

In part, the present invention is the result of the present inventor's recognition that couplings which are specifically designed to resolve the complex motion of a downhole drilling progressive cavity drive train do not have to be capable of large angular deviations between adjacent shafts in the coupling. In fact, by making the coupling sufficiently long, the rotor motion can be resolved by a coupling, the shaft of which are typically not skewed by more than 5°. It follows that couplings specifically designed for use in downhole drilling progressive cavity devices do not need to have the flexibility typically required of U-joints. Recognizing this has enabled the present inventor to design a coupling with limited, but sufficient, flexibility and the ability to transmit the necessary torque and thrust loads. This coupling serves two purposes: allowing bending as required for directional drilling and converting complex rotor motion into simple rotation.

The articulated coupling of the present invention includes two distinct sections. The first is a torque transmitting section capable of transmitting the necessary torque but transmitting no thrust load. The second section is a thrust transmitting section capable of transmitting the necessary thrust but incapable of transmitting any torque. The thrust transmitting section and the torque transmitting section are both capable of bending as necessary to accommodate directional drilling. The articulated coupling of the present invention is intended to be used as part of a drilling apparatus which includes at least a drill bit, a drill bit driving shaft and a progressive cavity drive train or other drilling motor.

The articulated drill string coupling includes a first stub shaft and a second stub shaft. The stub shafts are connected to ends of the drill string at the point along the drill string where bending is required. The stub shafts are connected to one another by an intermediate member. The intermediate member includes a thrust transmitting portion, a torque transmitting portion and a coupling end assembly at each end of the intermediate member for coupling the torque transmitting portion and the thrust transmitting portion to the respective stub shafts. The torque transmitting element is located between the first and second stub shafts and is constructed so as to transmit torque but no thrust load. Likewise, the thrust transmitting member extends between the first and second shafts and is designed to transmit thrust loads but to transmit no torque loads.

Several forms of torque transmitting elements and thrust transmitting elements are contemplated. For instance, the torque transmitting element may be constructed as a series of rings connected to one another by pins, each pin secured to one ring and received in an adjacent ring so as to transmit torque but to slide in the axial direction so as to not transmit thrust. The rings are spaced apart so as to allow bending of the torque transmitting member. Alternatively, the torque transmitting member may comprise a series of ring slidably connected to a flexible shaft. Each ring is welded to an adjacent ring or appended to an adjacent ring so that torque is transmitted. However, because of the slidable connection of the rings to the central shaft no thrust is transmitted through these rings. Another alternative construction for the torque transmitting portion is a continuous sleeve having openings formed therein to form a structure which is deflectable but can reliably transmit torque. Several possible constructions of this type are available.

The thrust transmitting member may be a simple thin metal shaft known in the art as a flexible shaft. Despite the thinness of the shaft it is capable of transmitting the necessary thrust load while still being able to bend the necessary 4°. The flexible shaft is connected between the first and second stub shafts so as to reliably transmit thrust forces but such that it does not transmit any torque loads. As an alternative to a flexible shaft, a series of spherical seats can be used. These seats are preferably connected to outer rings which constitute part of the torque transmitting member such that spherical seats provide a continuous connection between the first and second shaft so as to reliably transmit thrust while at the same time allowing pivoting with respect to one another in response to torque loads.

Taking the foregoing into account, various constructions are possible. For instance, the torque transmitting portion may comprise an axially arranged series of rings torsionally coupled to one another by a plurality of axial pins. The rings can be axially spaced from one another. Preferably each of the axial pins is: rigidly secured to one ring and slidable with respect to another ring. An O-ring may be provided around each axial pin to separate adjacent rings.

Alternatively, the torque transmitting portion may comprise a unitary member having a plurality of spaced slots formed therein. The slots are arranged so as to define an axially arranged series of rings connected to one another by a plurality of beam-like ligaments. In one embodiment, each of the ligaments comprises a plurality of beam portions.

The thrust transmitting portion may comprise a flexible shaft. Alternatively, the thrust transmitting portion may comprise an axially arranged series of thrust transmitting members. Each such thrust transmitting member has two transmitting surfaces and each such surface is in contact with another transmitting surface so as to define an axially arranged series of contacting surfaces. At least one surface of each pair of contacting surfaces is curved, preferably spherical, to permit pivoting movement of the transmitting member relative to one another. One or both of the contacting surfaces may be formed of an elastomer. The series of surfaces can be held together by a wire rope. The series of surfaces can be formed integrally with the torque transmitting portion.

The torque transmitting portion may also comprise a series of axially arranged rings directly connected to one another. The rings can be welded to one another or pinned to one another. The rings can be slidably supported on the thrust transmitting portion by one or more beam members.

BRIEF DESCRIPTION OF THE DRAWINGS

Other objects, features, and advantages of the present invention are hereinafter set forth and explained with reference to the drawings wherein.

DETAILED DESCRIPTION OF THE DRAWINGS

For purposes of this description, the coupling of the present invention will be described as part of a progressive cavity drive train. At the outset, however, it is noted that the coupling can be used with other downhole motors such as turbine-type and electric motors for purposes of directional drilling. The use of the coupling of the present invention to accommodate directional drilling is the same regardless of the specific type of downhole motors used. However, additional benefits are derived from using the coupling of the present invention with a progressive cavity drive train—namely the elimination of the need for a separate U-joint or other coupling to convert the complex rotor motor. For these reasons, it is both necessary and sufficient to describe the present invention in the context of a progressive cavity drive train.

Figure 1:
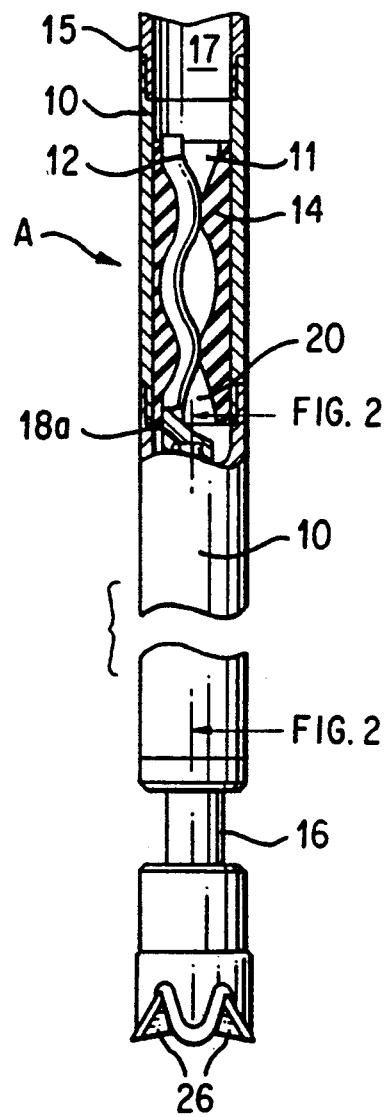
FIG. 1 is an elevation view partly in section of the overall structure of the downhole drilling apparatus of the present invention.
Figure 3:
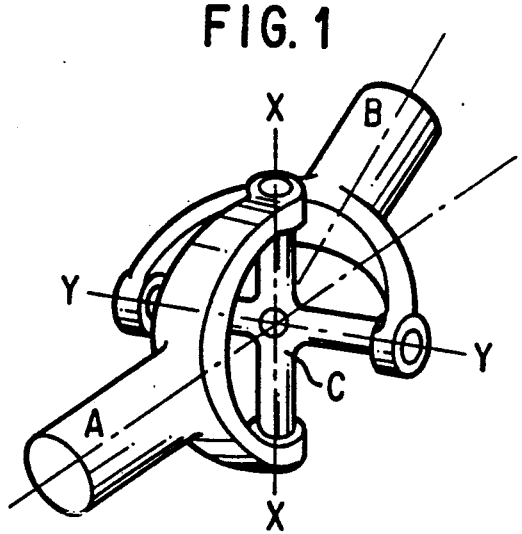
FIG. 3 is a perspective view of a conventional universal joint assembly.

FIG. 1 shows the overall structure of a progressive cavity drilling apparatus using the drive train of the present invention. The apparatus includes a drill string 15, a progressive cavity drive train, a drill bit drive shaft 16 and a drill bit 26. The drive train of the present invention includes a progressive cavity device and an articulated coupling for converting the motion of the rotor of the progressive cavity device, i.e., orbiting of the rotor and the rotational motion of the rotor, into rotation about a single axis at the same speed.

As illustrated in FIG. 1, the progressive cavity device A has a stator, a rotor, a passageway 11 for fluid to enter between the stator and the rotor, and a passageway 20 for the fluid to exit therefrom. In the drawings, the housing 10 and its flexible lining 14 are held against movement so that they function as the stator in the device A and the shaft 12 functions as the rotor. The housing 10 is tubular and its interior communicates with inlet 11 in the top portion of the lining 14 to provide a passageway for fluid to enter the progressive cavity device A. Outlet 20 in the bottom portion of the lining 19 serves as the passageway for fluid to discharge from the progressive cavity device A. The shaft 12 is precisely controlled so as to roll within the lining 14. The progressive cavity device A is attached to the lower end of a drill string 15.

The lower end of the rotor shaft 12 includes a connecting portion 18a. The connecting portion 18a connects the rotor 12 to a complementary connecting portion 18b of a stub shaft of the articulated coupling described below. The coupling is located in the lower part of the housing 10 and is not visible in FIG. 1.

The progressive cavity drive train of the present invention functions as a fluid motor or driving apparatus for driving the drilling apparatus shown in FIG. 1. Thus, a pressurized fluid, typically water carrying suspended particles commonly referred to as "mud", is forced into the progressive cavity device. The rotor 12 responds to the flowing fluid to produce a rotor driving motion which is simultaneously a rotation, an oscillation, and a orbit. The coupling, described below, attached to the rotor 12 at connection point 18a and aligned with the true center of the rotor converts this rotor driving motion into rotational driving motion substantially about a single axis.

Figure 2:
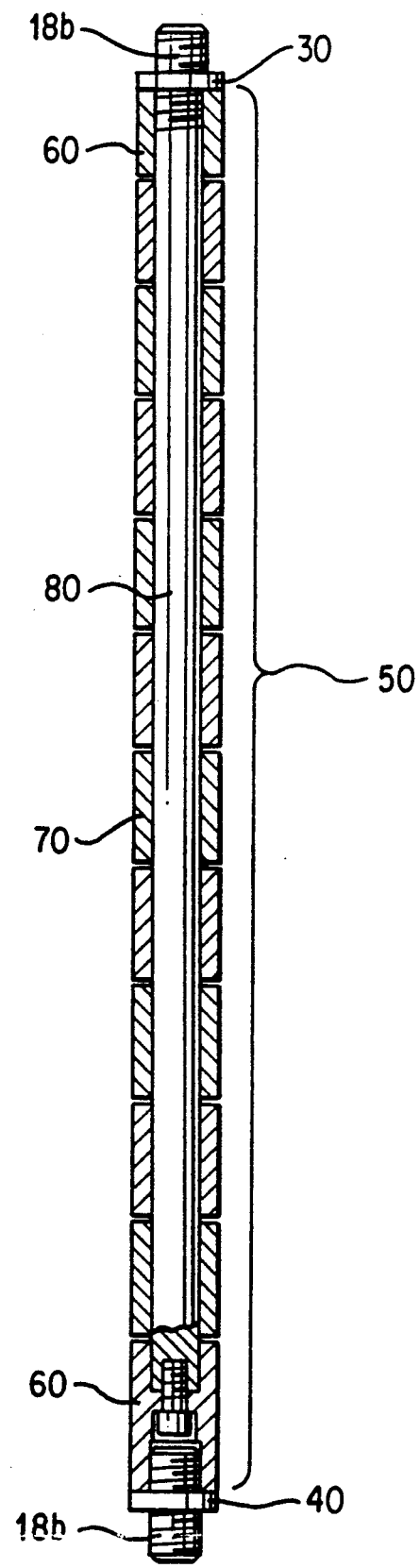
FIG. 2 is a side view, partially in section, of an embodiment of the articulated coupling of the present invention.

FIG. 2 shows the general construction of the articulated coupling of the present invention with details relating to a first embodiment thereof. Specifically, the coupling includes a first stub shaft 30, a second stub shaft 40, and an intermediate member 50. The intermediate member includes a torque transmitting portion 70 and a thrust transmitting portion 80. The stub shafts 30, 40 each include a connecting portion 18b which allows the stub shafts to be connected to either the rotor 12 or the drill bit drive shaft 16 in the manner described above. Although a specific connecting means is shown, i.e., threads on the end of the stub shaft, other connecting means such as splines or the like, could be employed. Additionally, as mentioned above, the stub shafts could be formed integrally with either the rotor shaft 12 or the drill bit drive shaft 16.

Figure 4:
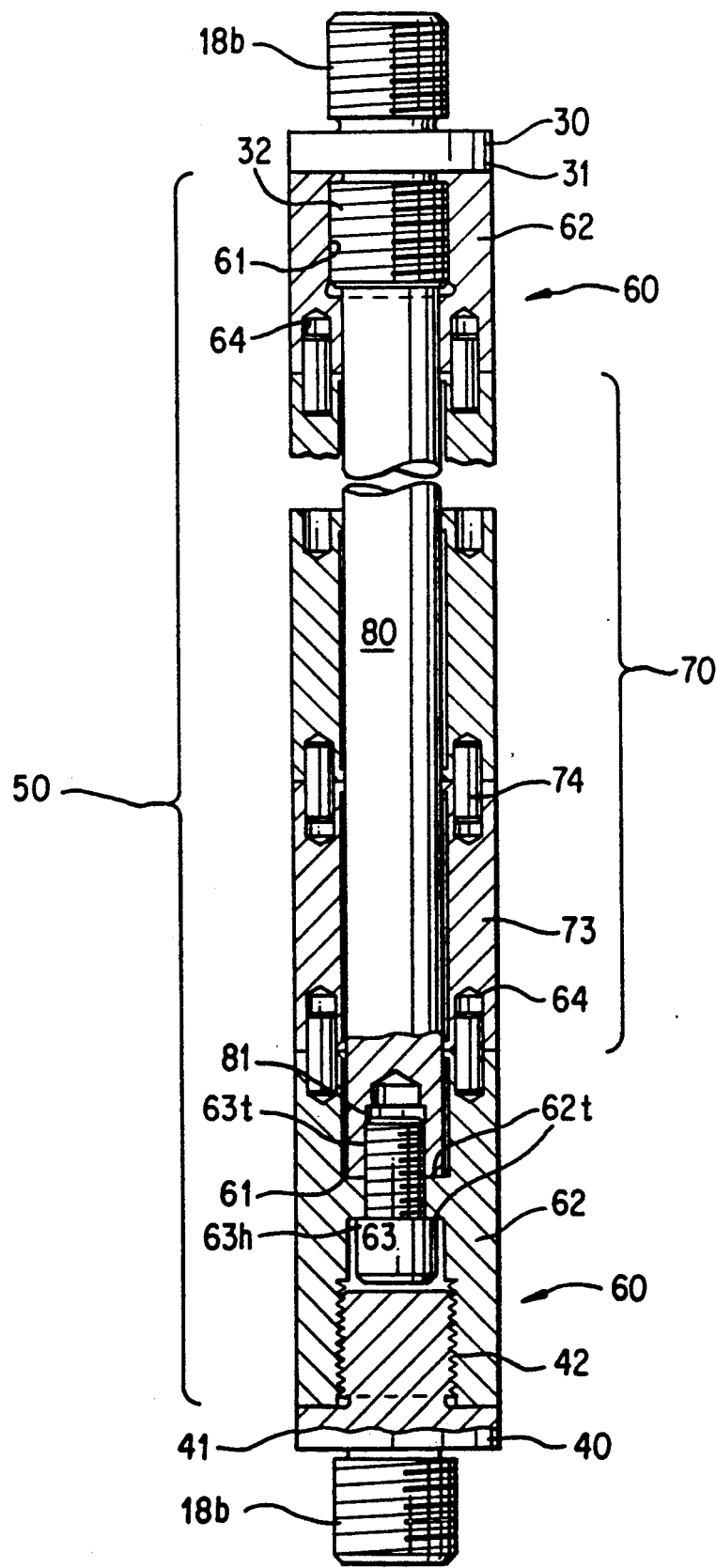
FIG. 4 is a side section of a first embodiment of the present invention.
Figure 5:
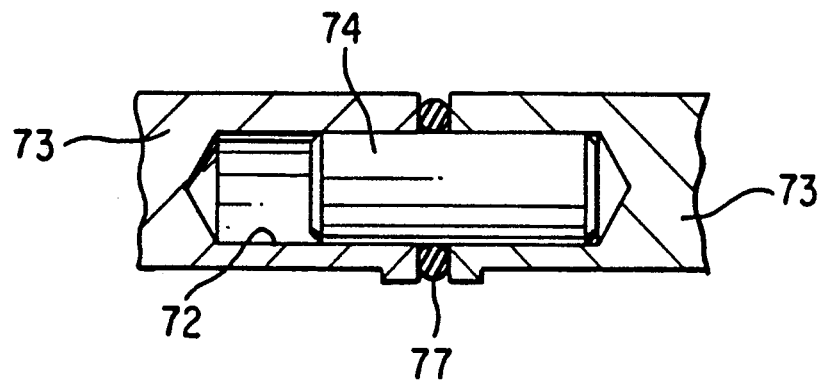
FIG. 5 is a detail side view of the embodiment of FIG. 4.
Figure 6:
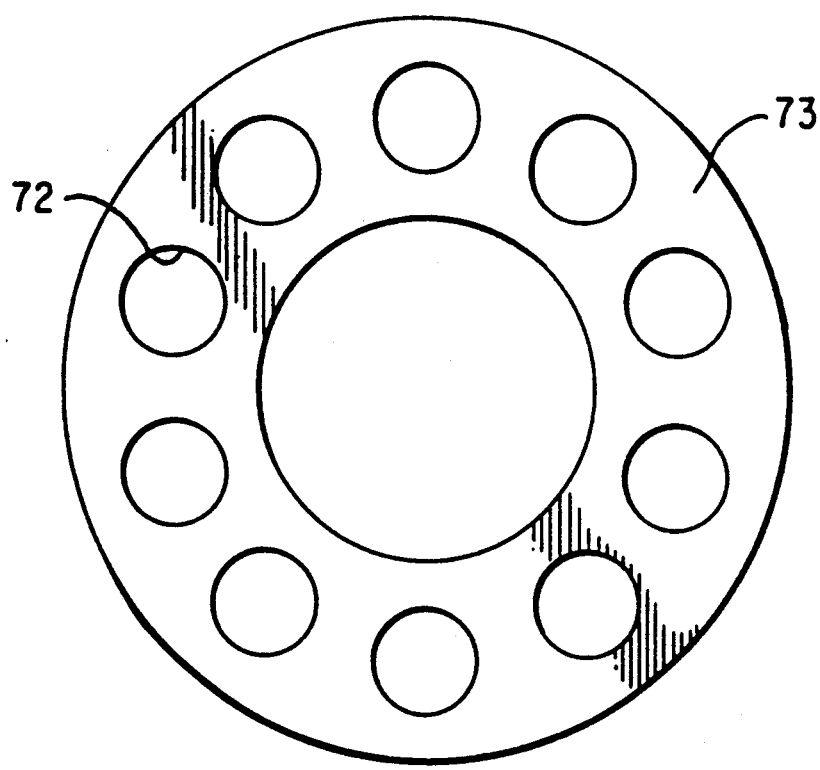
FIG. 6 is an end view of a sealing ring component of the embodiment of FIG. 4.

FIGS. 4-6 illustrate the details of a first embodiment of an articulated coupling according to the present invention. The overall configuration of this embodiment is shown in FIG. 2. FIG. 4 shows a portion of the length of the articulated coupling. To permit detailed illustration a portion of the coupling is cut away such that the coupling appears shorter than it actually is. FIG. 2 more accurately depicts the length of the coupling. As shown in FIG. 4, the coupling includes a first stub shaft 30, a second stub shaft 40 and an intermediate member 50 coupling the first stub shaft 30 to the second stub shaft 40. The intermediate member includes a torque transmitting portion 70, a thrust transmitting portion 80 and a coupling end assembly 60 at each end of the intermediate member 50 for coupling the torque transmitting portion 70 and the thrust transmitting portion 80 to the stub shafts 30, 40.

As noted above, one end of the coupling is directly connected, by threads splines or the like, to the rotor shaft 12. The other end of the coupling is similarly connected to a drill bit drive shaft 16. Typically, the coupling includes separate stub shafts which are connected to the rotor shaft 12 and drive shaft 16 by connecting means 18b such as threads, splines and the like. Of course, a stub shaft could be integrally formed to either of these shafts, if desired. The drill bit drive shaft 16 is rotatably connected to a conventional drill bit 26.

In the embodiment illustrated, the thrust transmitting portion 80 is simply a shaft which is thin enough to bend, i.e., a flexible shaft. The shaft 80 is coupled to the first and second stub shafts 30, 40 respectively by the coupling end assembly 60. The coupling end assembly includes an internal bore 61 adapted to receive an end of the stub shaft 30. In the illustrated embodiment, the stub shafts 30, 40 are shown connected to the coupling end assembly 60 by a specific connecting means, i.e., threads on the ends of the stub shaft received in the bore 61. Other connecting means such as splines or the like, could, of course, be employed. Additionally, the stub shafts could be formed integrally with the coupling end assembly. However, in this case, integral formation of stub shafts with the coupling end assembly would require modification so as to allow assembly of the connecting bolt 63 as described below. The coupling end assembly includes a sleeve-like body member 62, a stepped bore 61 formed centrally through the sleeve-like body member 62 and a connecting bolt 63. As shown in FIG. 4 and discussed above, a portion of the stub shafts 30, 40 is preferably received in one portion of the stepped bore 61. This portion of the stepped bore 61 may be threaded as shown or splined to receive the end of the stub shaft. Additionally, the stub shafts 30, 40 include radial flange portions 31, 41 respectively which abut axial ends of the coupling end assembly 60 to allow thrust transmission, as discussed below.

In accordance with one aspect of the present invention, the thrust transmitting portion 80 may be integrally formed with one of the stub shafts. However, in order to ensure that the thrust transmitting portion 80 does not transmit torque, it must be connected to at least one of the stub shafts so that torque is not transmitted between the thrust transmitting portion 80 and the stub shaft. In the illustrated embodiment, the thrust transmitting portion 80 is shown formed integrally with the first stub shaft 30 but connected to the second stub shaft 40 through the coupling end assembly 60 via a connecting bolt 63. As shown in FIG. 4, the connecting bolt 63 has a head portion 63h and a thread portion 63t. The bolt head 63h is wider than the threaded portion 63t such that the threaded portion can pass through a narrowed portion of the sleeve-like body member but the head portion 63h abuts against the surface 62t of the narrow portion of the sleeve-like body member 62. The thread portion 63t is long enough to extend past the narrow portion of the bore 61 formed in the sleeve-like body member 62 and into a threaded opening 81 formed in the thrust transmitting portion 80. The narrow portion of the bore 61 is unthreaded so that the threaded portion 63t of the bolt can rotate freely within the bore 61. Thus, when the bolt 63 is threaded tightly into the threaded bore 81 formed in the end of the thrust transmitting portion 80, the thrust transmitting portion 80 and the bolt 63 act as a single element having surfaces in engagement with thrust faces 62t of the sleeve-like body member 62 but being rotatable relative to the sleeve-like body member 62. By virtue of this connection, thrust loads can be transmitted from the thrust transmitting portion 80 to the second stub shaft 40 via the coupling end assembly since such loads would be applied against the thrust faces 62t of the coupling end assembly by the end of the thrust transmitting portion 80 or the head of the bolt 63h. However, torsional forces will not be transmitted since the thrust transmitting portion 80 can turn freely relative to the coupling and assembly 60.

From the above, it should be apparent how the thrust transmitting portion achieves its desired function of transmitting thrust between the first stub shaft 30 and the second stub shaft 40 without transmitting torque. In particular, thrust acting on the first stub shaft 30 is directly transmitted to the thrust transmitting portion 80 since, in this embodiment, the two are integrally formed. Thrust is applied from the thrust transmitting portion 80 to the coupling end assembly by the bolt 63 and flexible shaft 80 which act as a single thrust transmitting member. Again, the thrust forces are received on the thrust faces 62t of the sleeve-like body member 62 of the coupling end assembly 60. Thrust is then transmitted from the axial ends of the coupling end assembly 60 to the radial flanges 31, 41 of the stub shafts 30, 40, respectively. When torque is applied to the first stub shaft 30 the thrust transmitting portion 80 formed integrally with the first stub shaft 30 turns with the first stub shaft 30. The threaded bolt 63 received in the end of the thrust transmitting portion 80 also turns. However, because the portion of the stepped bore 61 through which the threaded bolt 63 extends is smooth, i.e., not threaded, the bolt 63 and thrust transmitting portion 80 are incapable of transmitting such rotation to the sleeve-like body member 62 of the coupling end assembly. Consequently, torque is not transmitted at this point. Though there is no torque transmitted between these elements, the coupling end assembly does, in fact, rotate with the thrust transmitting portion 80 as a result of the torque transmitting portion 7, described below. This is important because it ensures that the bolt 63 will not thread itself out of the end of the thrust transmitting portion 80 as a result of relative movement of the sleeve-like body member 62.

The torque transmitting portion 70 comprises a series of torque transmitting rings 73. The number of torque transmitting rings 73 depends on the desired application and the amount of bending necessary. In a preferred embodiment of the present invention, illustrated in general in FIG. 2, about 10 such torque transmitting rings are used. Each torque ring 73 comprises a generally tube-like hollow cylindrical member having flat end faces at each end thereof. A series of spaced openings 72 (preferably cylindrical) are formed in the planar end faces of the torque transmitting rings. As best shown in FIG. 6 the openings 72 are preferably circumferentially spaced about the end face of the torque transmitting ring 73. Naturally, the openings 72 could have various shapes, however the cylindrical configuration illustrated is most convenient. In the assembled state shown in FIG. 4, the end faces of adjacent rings are in contact with one another or, most preferably, spaced slightly apart. The openings 72 in the adjacent end faces are aligned and a connecting pin 74 extends within the aligned openings 72 to couple the adjacent end rings 73 as shown in FIG. 4. The connecting pins 74 have a shape, preferably cylindrical, which allows them to be received in the opening 72. Preferably the connecting pins 74 are press fit or otherwise secured in the openings of one of the two adjacent rings 73 and slidable in the openings 72 of the other of the two adjacent rings 73. As best shown in FIGS. 4 and 5, the connecting pins 74 connect the adjacent rings 73 so that the rings rotate as a single element. As shown in FIG. 5, if it desired to space the adjacent rings 73 apart an O-ring 77 or a similar elastomeric spacer can be used. The advantages of spacing the end faces apart is that it makes the torque transmitting portion 70 somewhat more flexible to allow greater bending.

As shown in FIG. 4, a coupling end assembly 60 at either end of the coupling include openings 64 for receiving connecting pins 74 of the first and last rings 73. In this way, the assembly of rings 73 is connected to the coupling end assemblies 60 in the same way that adjacent rings 73 are connected. Thus, in this embodiment, the inner axial end face of each of the coupling end assemblies 60 has the same appearance as the end of the sealing rings 73 shown in FIG. 6. The outer end faces about the radial flanges 31, 41 of the stub shafts 30, 40, respectively.

At this point, it should be apparent how the torque transmitting portion 70 achieves its desired function of transmitting torque between the first stub shaft 30 and the second stub shaft 40. In particular, torque acting on the first stub shaft 30 is transmitted to coupling end assembly 60 through splines 32 or the like. Torque is transmitted from the coupling end assembly 60 to the torque transmitting portion 70 through the connecting pins 74 extending from the end face of the first ring 73. Then, torque is transmitted to each successive ring 73 via connecting pins 74. At the end of the torque transmitting portion 70, torque is transmitted from the last ring 73 to the coupling end assembly 60 and from the coupling end assembly to the second stub shaft 40 by way of splines 42 which are received in a splined portion of the stepped bore 61.

The thrust transmitting portion 70, b cause of its width, has sufficient torque transmitting capability to transmit all of the load typically experienced down hole. The width of the torque transmitting portion 70 does, however, not prevent bending of the torque transmitting portion 70. This is because the torque is articulated by virtue of the segmented ring construction 73 and the connecting pins 74. Specifically, the pins 74 couple the adjacent rings 73 such that each ring can move slightly with respect to its adjacent ring 73. The slight movement of each ring 73 with respect to its adjacent ring, collectively results in a ring assembly with sufficient flexibility to allow the necessary 5° of bending. For instance, if a ring assembly such as that shown in FIGS. 2 and 4–6 must bend a total of 5°, and if there are, for example, 10 ring interfaces, the necessary movement at each interface is 0.5°. This can be achieved by relative movement of about 0.01 inches at each interface. Thus, it is apparent that the necessary deflection can be achieved through a very small movement at each ring interface. If additional deflection is necessary or the amount of deflection at each interface must be reduced, additional rings can be used.

The rings are able to move with respect to adjacent rings, because, as noted above, the pins 74 are only pressed into the openings of one of any two adjacent rings. Thus, with references to FIG. 5, the pins 74 might be press fit into the openings in the ring 73 on the right and slidably received in the openings 72 of the ring 73 on the left. Thus, the pin 74 is always slidably received in the opening 72 of one of the rings 73 and press fit in the opening 72 of the other ring. In this way, the rings 73 are slidably connected in the axial direction. By virtue of such a construction, the thrust transmitting capability of the torque transmitting portion 70 is sharply limited. However, this does not present a problem since the thrust transmitting portion 80 is capable of transmitting all thrust loads experienced. By spacing the adjacent rings 73 apart as shown in FIG. 5 additional flexibility is provided. For this reason, the rings 73 are preferably spaced.

Thus, it can be seen that the structure shown in FIGS. 4–6 provides an articulated coupling which is capable of bending up to 5° and transmitting torque and thrust through separate elements. Each of the elements 70, 80 is designed especially for the purpose for which it is used such that optimum performance is obtained. In a more general sense, the articulated coupling includes the first stub shaft 30, the intermediate member 50 having a torque transmitting portion 70 and a thrust transmitting portion 80 and the second stub shaft 40.

Figure 7:
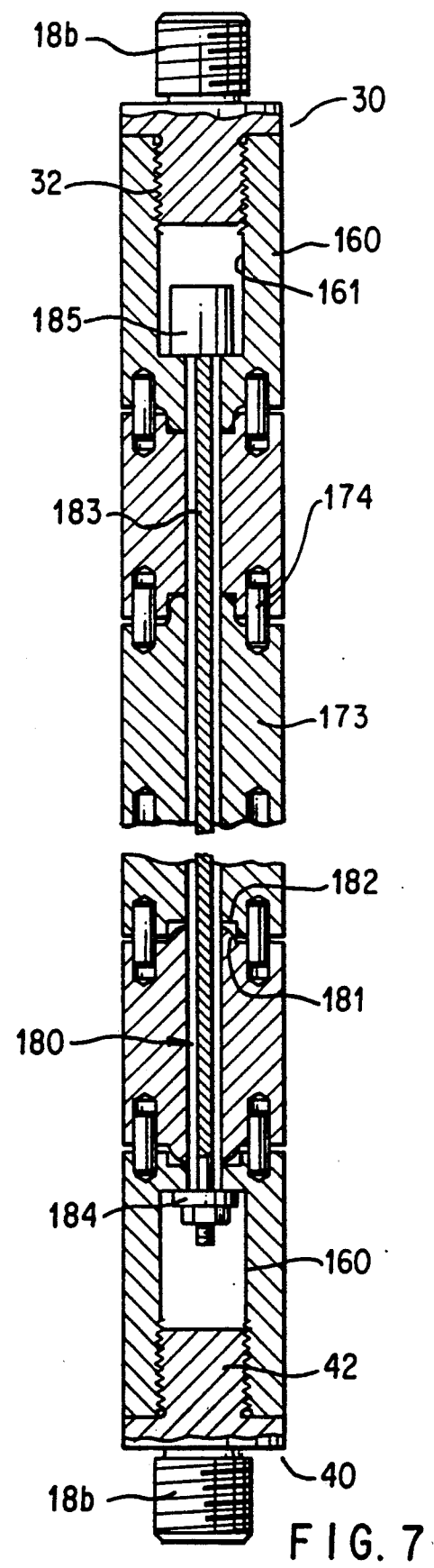
FIG. 7 is a side section of another embodiment of the present invention.

FIG. 7 shows a modified articulated coupling assembly. In this assembly, similar components are identified by the same or similar reference numerals. In this embodiment, parts of the distinct torque transmitting portion and thrust transmitting portions are formed integrally. The torque transmitting construction is generally the same as that in the embodiment of FIGS. 4-6. Specifically, the stub shafts 30 and 40 are coupled to one another via a series of rings connected via pins. In FIG. 7, the rings 173 are spaced apart from one another and connected by pins 174. The difference between the articulated coupling shown in FIG. 7 and the previously described embodiment of FIGS. 4-6 essentially resides in the construction of the thrust transmitting element. In the embodiment of FIG. 7, thrust is transmitted through thrust transmitting portions 181, 182 formed integrally with the rings 173. In particular, as shown in FIG. 7, a number of the rings 173 have rounded bearing surfaces 181 while the other rings have flat surfaces 182. When assembled as shown in FIG. 7, the rounded surfaces 181 contact the flat surfaces 182 such that the adjacent rings 173 contact one another in the manner of a spherical bearing. The abutting surfaces 181, 182 also maintain a space between the outer portion of the rings 173. By virtue of this connection, thrust can be transmitted through the adjacent rings 173 but, the adjacent rings can be articulated slightly with respect to one another. Again, since there are typically about 10 such interfaces between adjacent rings, the amount of movement required at each interface is relatively small. Also, the spacing of the rings 173 at the outer periphery thereof where the pins connect the rings aids relative displacement.

The coupling end assemblies 160 are generally similar to those used in the embodiment of FIGS. 4-6 with several exceptions. First, the coupling end assemblies 160 can include bearing surfaces 181, 182 to mate with the rings 173 adjacent thereto. Moreover, there is no need for a stepped bore to accommodate a bolt head since a flexible shaft is not included. However, the coupling end assemblies 160 do include stepped bores for accommodating the wire rope assembly described below.

In order to hold the rings and coupling end assemblies 160 in the assembled state, a wire rope assembly 180 is used. The wire rope assembly includes a wire rope or cable 183 connected at one end to a head portion 185 and its other end to a tightening bolt assembly 184. The wire rope or cable 183 has a high tensile strength so that when assembled as shown, it securely retains the rings 173 and coupling end assemblies 160 in the assembled state. To ensure that the components are tightly retained, the tightening nut assembly 174 can be tightened until the cable or 183 is tensed. While the wire rope assembly 180 is inextensible in the tensile direction, it is, of course, flexible so as to permit articulation of adjacent rings in the coupling assembly generally.

Thus, it can be appreciated that the articulated coupling assembly of FIG. 7 achieves the desired functions of providing an articulated coupling with distinct thrust and torque transmitting portions. Specifically, as with the embodiment of FIGS. 4-6, torque is transmitted between adjacent rings 173 via the torque transmitting pins 174. On the other hand, thrust is transmitted through the thrust bearing surfaces 180 and 181. Further, because of the overall assembly including spacing of adjacent rings from one another and the spherical contact surfaces of the thrust bearing members 181, the assembly has the flexibility needed for use downhole.

Figure 8:
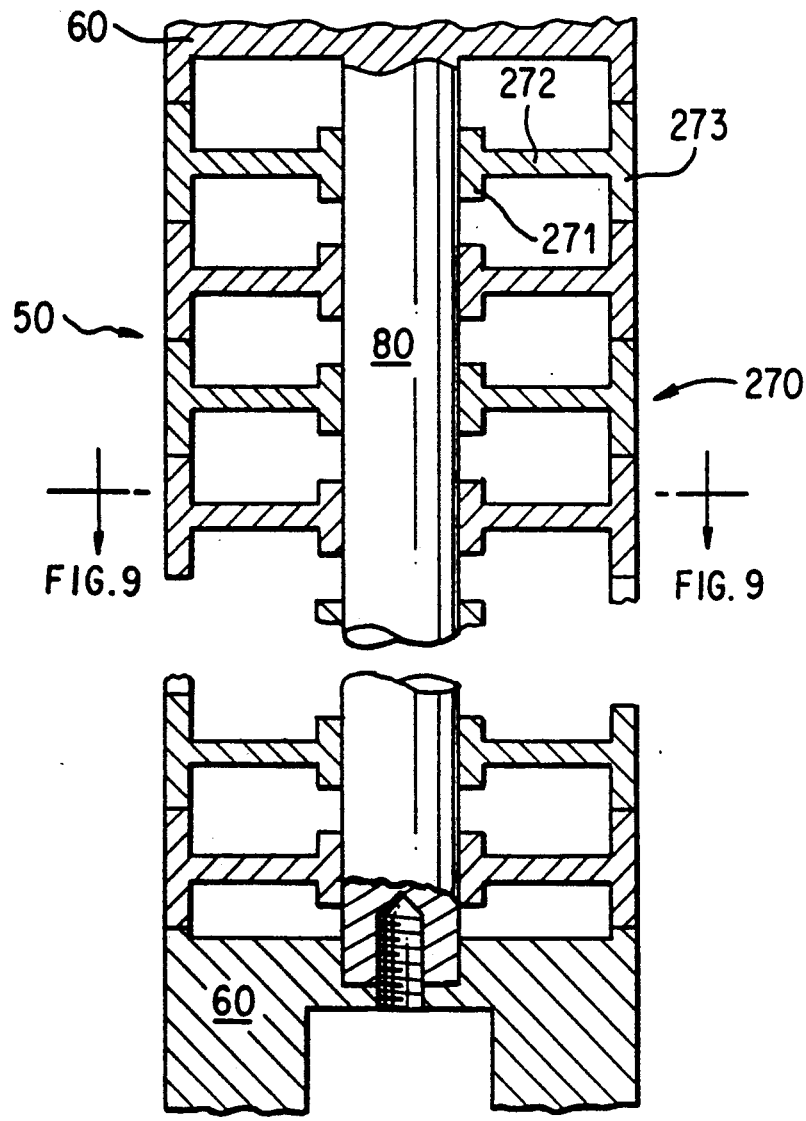
FIG. 8 is a side section of an alternative construction according to the present invention.
Figure 8A:
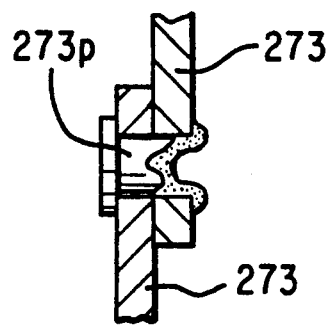
FIG. 8A shows an alternative construction for use in the embodiment of FIG. 8.
Figure 9:
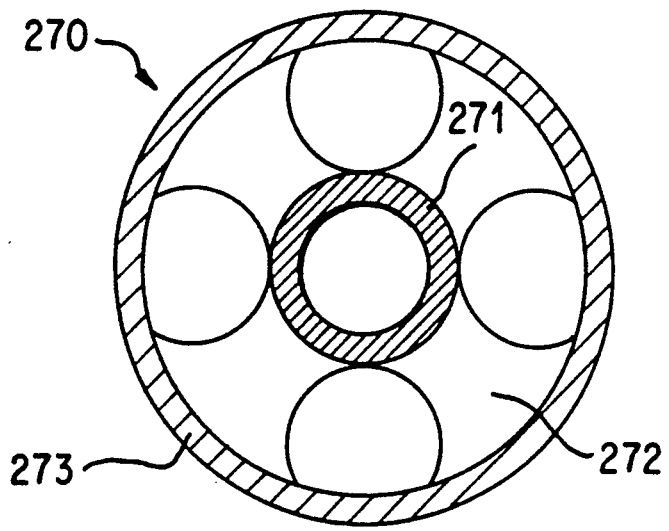
FIG. 9 is a top view of the embodiment of FIG. 7.

FIGS. 8, 8A and 9 show a modified intermediate member 50 for use in a coupling assembly of the type shown in FIG. 4. In this embodiment, the coupling assembly is essentially identical to that shown in FIGS. 4-6 with respect to the stub shafts (not shown) the coupling end assemblies 60 and the flexible shaft 80. The difference resides in the construction of the torque transmitting portion 270. Like the embodiment of FIGS. 4-6, this embodiment employs connected rings 273 to transmit torque. However, in this embodiment, the adjacent rings 273 are directly connected to the coupling end assemblies and one another such as by welding as shown in FIG. 8 or rivets or by pins 273p as shown schematically in FIG. 8A or threads. Each of the rings 273 constitute the outer periphery of a beam mounted ring assembly which further includes a sleeve portion 271 slidably mounted on the flexible shaft 80 and a thin flexible beam 272 coupling the sleeve 271 to the ring 273. In the assembled state as shown in FIG. 8, the series of rings 273 are supported on the flexible shaft via the sleeve and the flexible beams 272. The rings 273 and support members 272 are sufficiently flexible that the assembly is capable of deflecting as necessary. This is made possible because the rings 273 are slidable on the flexible shaft.

FIG. 9 shows a cross-section of the assembly of FIG. 8 along the lines indicated in FIG. 8. In this view, the relationship between the ring 273, the sleeve 271 and the flexible beam 272 is readily apparent. Moreover, this view illustrates how the beam 272 is cut away to enhance flexibility.

Figure 11:
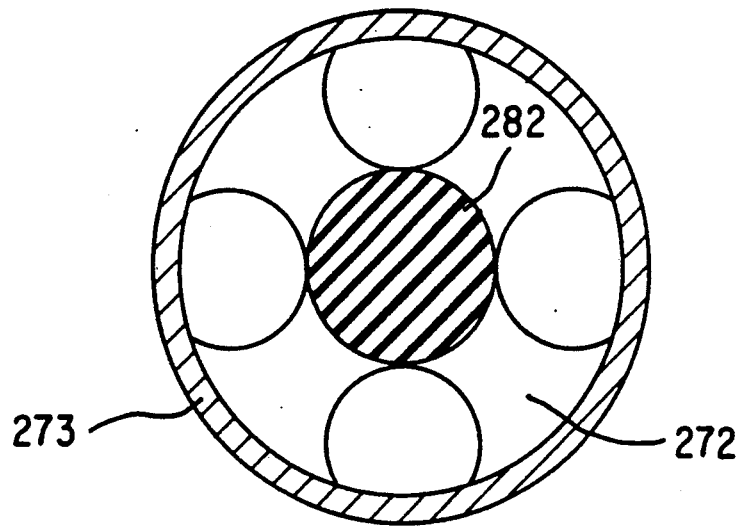
FIG. 11 is a top view of a component of the embodiment of FIG. 10.
Figure 10:
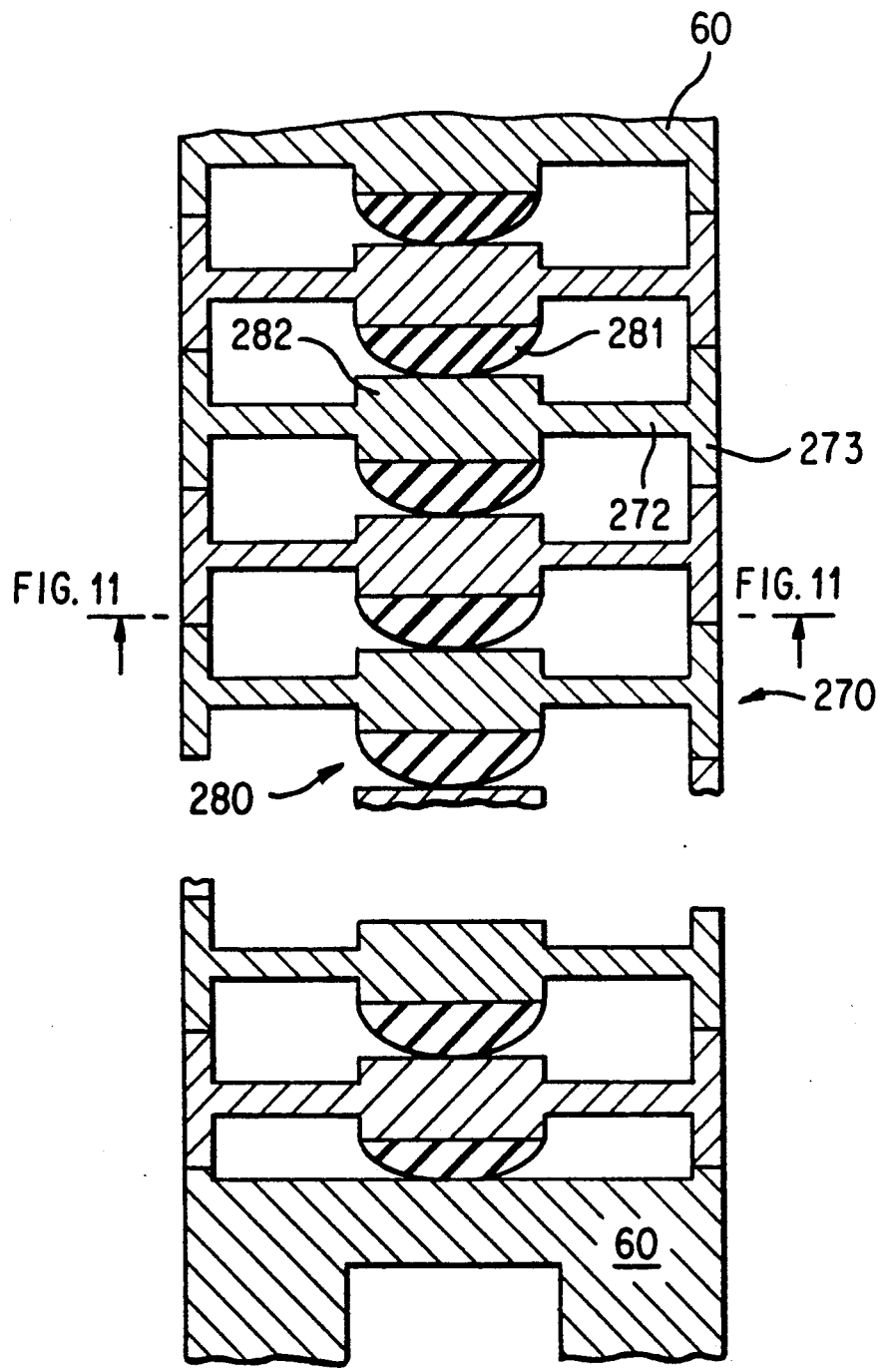
FIG. 10 is a side section of another alternative construction according to the present invention.

FIGS. 10 and 11 illustrate an embodiment similar to that shown in FIGS. 8, 8A and 9 except for a different thrust transmitting portion. Specifically, rather than a flexible shaft 80, the thrust transmitting portion 280 of this embodiment includes a series of contacting thrust bearing surfaces 281 and 282 through which thrust is transmitted. In particular, the thin beam-like members 272 extending from the rings 273 support a thrust bearing element. This thrust bearing element includes a flat surface 282 and a spherical surface 281. In the assembled state indicated in FIG. 10, the spherical portion 281 of each ring assembly contact the flat portion 282 of an adjacent ring assembly as shown in FIG. 10. By virtue of this arrangement, thrust loads can be transmitted directly through the ring assembly by virtue of contact between the spherical surfaces 281 and the flat surfaces 282

As previously explained with regard to the embodiment of FIG. 8, the rings 273 are preferably either welded or pinned together. By virtue of this connection, and the fact that the rings are supported on flexible beams 272, the outer ring assembly 270 can bend as necessary to accommodate conditions downhole. Moreover, because each ring assembly includes a spherical surface, the assembled construction of the thrust bearing portion 280 including the series of the contacting surfaces 282 and 281 is also flexible, i.e., it can bend the necessary 5° or so as necessary downhole.

In the embodiment shown in FIGS. 10 and 11, the spherical portion 281 of the thrust transmitting portion 280 is formed of hardened rubber. In some cases, this is desirable since rubber is more absorbent than metal.

Figure 12:
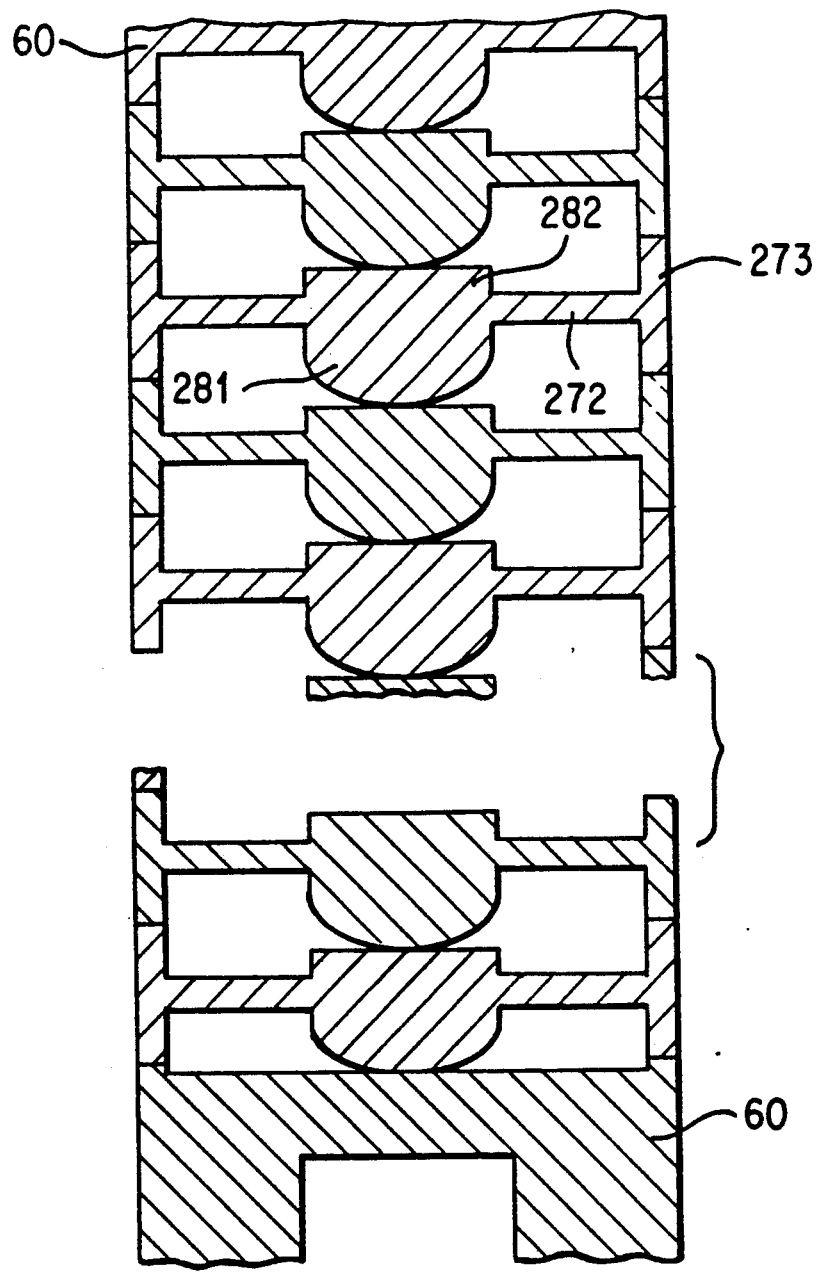
FIG. 12 is a side section of another alternative construction.

However, it is contemplated that in some cases, it may be desirable to use metal spherical surfaces 281. Such a construction is illustrated in FIG. 12 in which the flat surfaces 282 and the spherical surfaces 281 are formed integrally. In all other respects, the embodiment of FIG. 12 is similar to that of the embodiment illustrated in FIGS. 10 and 11.

Figure 14:
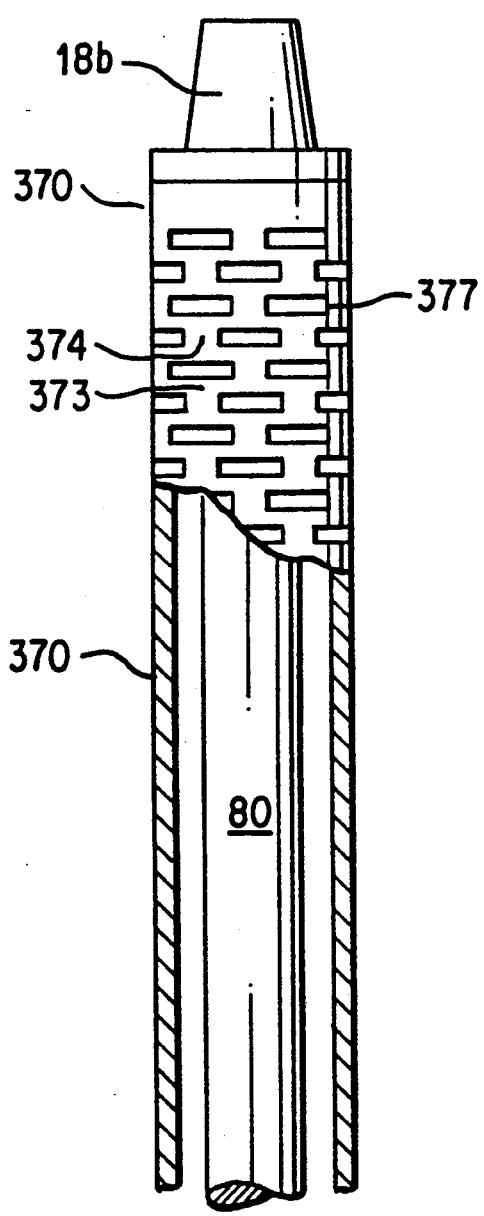
FIG. 14 is a partially sectional side view of a coupling according to the present invention.
Figure 15:
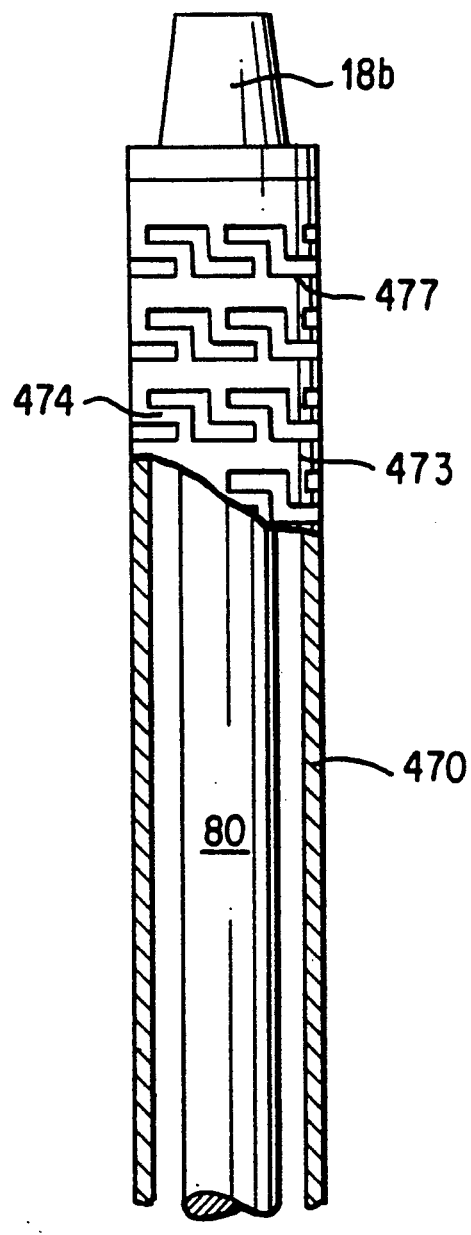
FIG. 15 is a partially sectional side view of another coupling.

In accordance with another aspect of the present invention, the torque transmitting portion of the articulated coupling may be constructed as a one piece flexible member. In order to achieve such a result, the one piece member must be sufficiently flexible to allow bending as necessary downhole (up to 5°) and at the same time have sufficient torsional rigidity to transmit the necessary torque. Examples of structures capable of achieving this result are shown in FIGS. 13–15.

Figure 13:
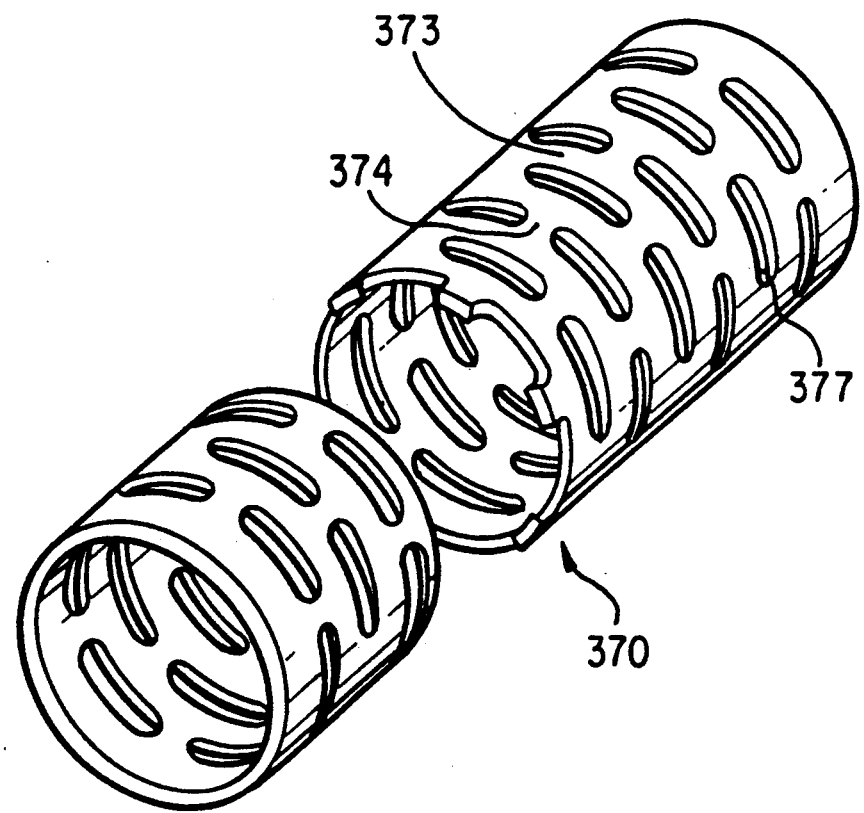
FIG. 13 is a perspective view of a torque transmitting portion.

FIG. 13 is a perspective view illustrating a torque transmitting element usable in an articulated coupling according to the present invention. This illustrates the basic concept of a one piece torque transmitting element. Specifically, the torque transmitting element 370 includes a unitary body formed with a plurality of spaced slots 377. The slots 377 in the embodiment illustrated in FIG. 13 are spaced so as to define an axially spaced series of ring portions 373 connected to one another by axially extending beam portions 374. By virtue of this construction, the unitary element 370 is torsionally rigid but somewhat flexible such that it can transmit the necessary torque while at the same time bending up to 5° as required downhole.

A torque transmitting portion such as that shown in FIG. 13 can be substituted for the torque transmitting portion 70 used in the articulated coupling of FIG. 4. An example of this is illustrated in FIG. 14 which shows a portion of a coupling identical to that shown in FIG. 4 except that the torque transmitting portion 70 used in FIG. 4 is replaced with a unitary torque transmitting portion 37 similar to that shown in FIG. 13. The modified torque transmitting portion 370 can be connected to the coupling end assemblies in any suitable manner such as by splines, threads or the like.

Of course, other unitary torque transmitting member designs are possible. For instance, FIG. 15 shows an alternative design similar to that shown in FIG. 14 in all respects except for the shape of the slots 477 formed in the torque transmitting portion 470 and the resulting configuration of the torque transmitting portion 470. In particular, in the embodiment shown in FIG. 15, the torque transmitting portion 470 comprises a plurality of axially spaced ring portions 473 separated from one another by beam like-support ligaments 474. Such a construction gives the torque transmitting portion 470 a great deal of flexibility without significantly sacrificing torque transmitting capability.

What is claimed is:

1. A progressive cavity drive train comprising:
   a housing structure;
   a stator, the stator having a longitudinal axis;
   a rotor having a true center, the rotor being located within the stator;
   the stator and the rotor each having coacting helical lobes which are in contact with one another at any transverse section, the stator having one more helical lobe than the rotor such that a plurality of cavities are defined between the rotor and the stator, and the rotor being adapted to rotate within the stator such that the true center of the rotor orbits the axis of the stator, the orbit having a predetermined radius and the orbit causing a progression of the cavities in the direction of the axis of the stator;
   a first stub shaft having a longitudinal axis and first and second longitudinal ends, the first end of the first stub shaft being connected to and movable with the rotor;
   a second stub shaft having first and second longitudinal ends and a longitudinal axis which is substantially colinear with the axis of the stator, the second stub shaft being rotatably mounted about its longitudinal axis within the housing structure,
   an intermediate member coupling the second end of the first stub shaft to the second stub shaft, the intermediate member including at least a torque transmitting portion and a separate thrust transmitting portion; the torque transmitting portion providing a rigid torsional connection between the first and second stub shafts so as to enable transmission of torque and the torque transmitting portion being non-rigid in the axial direction such that thrust is not transmitted therethrough; the thrust transmitting element being axially rigid so as to enable transmission o thrust loads and rotatably coupled to at least one of the first and second stub shafts such that torque is not transmitted therethrough; and
   whereby the intermediate member couples the first and second stub shafts such that the first stub shaft can rotate about its axis and orbit about the axis of the second stub shaft at the same time the second stub shaft rotates about its longitudinal axis.

2. The progressive cavity drive train of claim 1, wherein the first stub shaft is integrally connected with the rotor.

3. The progressive cavity drive train of claim 1, wherein the first stub shaft is connected to the rotor by a threaded coupling.

4. The progressive cavity drive train of claim 1, wherein the second stub shaft is rotatably supported in the housing structure by bearings.

5. The progressive cavity drive train of claim 1, further comprising a rotatable shaft rotatably mounted in the housing structure by bearings, the second stub shaft being secured to the rotatable shaft.

6. The progressive cavity drive train of claim 1, further comprising a drill bit operatively connected to and driven by the second stub shaft.

7. The progressive cavity drive train of claim 1, wherein the torque transmitting portion comprises an axially arranged series of rings torsionally coupled to one another by a plurality of axial pins.

8. The progressive cavity drive train of claim 7, wherein the rings are axially spaced from one another.

9. The progressive cavity drive train of claim 7, wherein each of the axial pins is rigidly secured to one ring and slidable with respect to another ring.

10. The progressive cavity drive train of claim 7, further comprising an O-ring around each axial pin separating adjacent rings.

11. The progressive cavity drive train of claim 1, wherein the torque transmitting portion comprises a unitary member, the unitary member having a plurality of spaced slots formed therein, the slots being arranged so as to define an axially arranged series of rings connected to one another by a plurality of beam-like ligaments.

12. The progressive cavity drive train of claim 11, wherein each of the ligaments comprises a plurality of beam portions.

13. The progressive cavity drive train of claim 1, wherein each intermediate member further comprises a coupling end assembly at each end of the intermediate member for coupling the torque transmitting portion and the thrust transmitting portion to the respective stub shafts.

14. The progressive cavity drive train of claim 1, wherein the thrust transmitting portion comprises a flexible shaft.

15. The progressive cavity drive train of claim 1, wherein the thrust transmitting portion comprises an axially arranged series of thrust transmitting members, each member having two transmitting surfaces and each such surface being in contact with another transmitting surface so as to define an axially arranged series of contacting surfaces, at least one surface of each pair of contacting surfaces being curved to permit pivoting movement of the transmitting member relative to one another.

16. The progressive cavity drive train of claim 15, wherein at least one of the contacting surfaces is formed of an elastomer.

17. The progressive cavity drive train of claim 15, wherein the series of surfaces are held together by a wire rope.

18. The progressive cavity drive train of claim 15, wherein the series of surfaces are formed integrally with the torque transmitting portion.

19. The progressive cavity drive train of claim 1, wherein the torque transmitting portion comprises a series of axially arranged rings directly connected to one another.

20. The progressive cavity drive train of claim 19, wherein the rings are welded to one another.

21. The progressive cavity drive train of claim 19, wherein the rings are pinned to one another.

22. A downhole drilling apparatus comprising:
a drill string;
a downhole motor connected to the lower end of the drill string, the downhole motor including a rotor;
an articulated coupling having first and second ends, first stub shaft at the first end a second stub shaft at the second end and an intermediate member having first and second ends, the intermediate member connected to the first stub shaft at the first end and the second stub shaft at the second end thereof, the intermediate member including at least one torque transmitting portion and a separate thrust transmitting portion; the torque transmitting portion transmitting substantially all torque between the first and second stub shafts and the thrust transmitting portion transmitting substantially all thrust between the first and second stub shafts;
wherein the first stub shaft of the articulated coupling is attached to the rotor; and
a drill bit drive shaft connected to the second stub shaft of the articulated coupling so as to rotate with the second stub shaft;
whereby the articulated coupling permits an angular deviation of the first stub shaft relative to the second stub shaft to accommodate directional drilling.

23. The drilling apparatus of claim 22, wherein the torque transmitting portion comprises an axially arranged series of rings torsionally coupled to one another by a plurality of axial pins.

24. The drilling apparatus of claim 22, wherein the torque transmitting portion comprises a unitary member, the unitary member having a plurality of spaced slots formed therein, the slots being arranged so as to define an axially arranged series of rings connected to one another by a plurality of beam-like ligaments.

25. The drilling apparatus of claim 22, wherein the thrust transmitting portion comprises an axially arranged series of thrust transmitting members, each member having two transmitting surfaces and each such surface being in contact with another transmitting surface so as to define an axially arranged series of contacting surfaces, at least one surface of each pair of contacting surfaces being curved to permit pivoting movement of the transmitting member relative to one another.

26. The drilling apparatus of claim 22, wherein the torque transmitting portion comprises a series of axially arranged rings directly connected to one another.

27. A directional drilling drive train for use in a downhole drilling apparatus, the drive train comprising:
a downhole motor having a rotor;
a first stub shaft having first and second longitudinal ends, the first stub shaft being secured at the first longitudinal end thereof to the rotor for movement therewith;
an intermediate member having first and second longitudinal ends, the first longitudinal end of the intermediate member being secured to the second longitudinal end of the first stub shaft for movement therewith, the first stub shaft thereby connecting the rotor to the intermediate member;
a second stub shaft having first and second longitudinal ends, the first longitudinal end of the second stub shaft being connected to the second longitudinal end of the intermediate member for movement therewith; a drill bit drive shaft, the drill bit drive shaft being mounted for rotation about a predetermined axis and being operatively connected to the drill bit of the downhole drilling assembly for driving the drill bit, the drill bit drive shaft having first and second longitudinal ends, the first longitudinal end of the drill bit drive shaft being secured for movement with the second stub shaft so as to rotate therewith and such that the second stub shaft connects the intermediate member to the drill bit drive shaft;
wherein the intermediate member includes at least two distinct portions which are movable with respect to one another, one portion transmitting substantially all torque between the first and second stub shafts and another portion transmitting substantially all thrust between the first and second stub shafts.

28. The drive train of claim 27, wherein the torque transmitting portion comprises an axially arranged series of rings torsionally coupled to one another by a plurality of axial pins.

29. The drive train of claim 27, wherein the torque transmitting portion comprises a unitary member, the unitary member having a plurality of spaced slots formed therein, the slots being arranged so as to define an axially arranged series of rings connected to one another by a plurality of beam-like ligaments.

30. The drive train of claim 27, wherein the thrust transmitting portion comprises an axially arranged series of thrust transmitting members, each member having two transmitting surfaces and each such surface being in contact with another transmitting surface so as to define an axially arranged series of contacting surfaces, at least one surface of each pair of contacting surfaces being curved to permit pivoting movement of the transmitting member relative to one another.

31. The drive train of claim 27, wherein the torque transmitting portion comprises a series of axially arranged rings directly connected to one another.

32. A directional drilling drive train for driving a downhole drill bit drive shaft about a single axis, the drive train comprising:
   a housing structure;
   a downhole motor having a rotor;
   a drill bit drive shaft mounted within the housing for rotation about a predetermined axis, the drill bit drive shaft having first and second longitudinal ends, the second longitudinal end being operatively connected to a drill bit for causing rotation of the drill bit about a predetermined axis;
   an articulated coupling having first and second longitudinal ends, the first longitudinal end of the articulated coupling being connected to the rotor and the second longitudinal end of the articulated coupling being connected to the first end of the drill bit drive shaft, the articulated coupling comprising a first stub shaft having first and second longitudinal ends, a second stub shaft having first and second longitudinal ends and an intermediate member having first and second longitudinal ends, the second longitudinal end of the first stub shaft being connected to the first longitudinal end of the intermediate member and the first longitudinal end of the second stub shaft being connected to the second longitudinal end of the intermediate member; and
   wherein the connection between the first stub shaft and the second stub shaft is provided by the intermediate member; and the intermediate member includes a torque transmitting portion for transmitting substantially all torque between the first and second stub shafts and a thrust transmitting portion for transmitting substantially all thrust between the first and second stub shafts.

33. The drive train of claim 32, wherein the torque transmitting portion comprises an axially arranged series of rings torsionally coupled to one another by a plurality of axial pins.

34. The drive train of claim 32, wherein the torque transmitting portion comprises a unitary member, the unitary member having a plurality of spaced slots formed therein, the slots being arranged so as to define an axially arranged series of rings connected to one another by a plurality of beam-like ligaments.

35. The drive train of claim 32, wherein the thrust transmitting portion comprises an axially arranged series of thrust transmitting members, each member having two transmitting surfaces and each such surface being in contact with another transmitting surface so as to define an axially arranged series of contacting surfaces, at least one surface of each pair of contacting surfaces being curved to permit pivoting movement of the transmitting member relative to one another.

36. The drive train of claim 32, wherein the torque transmitting portion comprises a series of axially arranged rings directly connected to one another.

37. A progressive cavity drive train for causing rotation of a drill bit drive shaft about a single axis, the progressive cavity drive train comprising:
   a housing structure;
   a stator, the stator having a longitudinal axis;
   a rotor having a true center, the rotor being located within the stator; the stator and the rotor each having coacting helical lobes which are in contact with one another at any transverse section, the stator having one more helical lobe than the rotor such that a plurality of cavities are defined between the rotor and the stator, and the rotor being adapted to rotate within the stator such that the true center of the rotor orbits the axis of the stator, the orbit having a predetermined radius and the orbit causing a progression of cavities in the direction of the axis of the stator;
   a first stub shaft having a longitudinal axis and first and second longitudinal ends, the first end of the first stub shaft being connected to and movable with the rotor;
   an intermediate member, the intermediate member having first and second longitudinal ends, the first end of the intermediate member being connected to the second end of the first stub shaft;
   a second stub shaft having a longitudinal axis which is substantially colinear with the axis of the stator and first and second longitudinal ends, the second stub shaft being rotatably mounted about its longitudinal axis within the housing structure, the second end of the second stub shaft being operatively connected to the drill bit drive shaft for rotating the drill bit drive shaft about a predetermined axis, the first end of the second stub shaft being connected to the second end of the intermediate member; and
   the intermediate member comprising a torque transmitting portion for transmitting torque between the first and second stub shafts and a thrust transmitting portion for transmitting thrust between the first and second stub shafts.

38. The progressive cavity drive train of claim 37, wherein the first stub shaft is integral with the rotor.

39. The progressive cavity drive train of claim 37, wherein the second stub shaft is integral with the drill bit drive shaft.

40. The progressive cavity drive train of claim 37, wherein the torque transmitting portion comprises an axially arranged series of rings torsionally coupled to one another by a plurality of axial pins.

41. The progressive cavity drive train of claim 37, wherein the torque transmitting portion comprises a unitary member, the unitary member having a plurality of spaced slots formed therein, the slots being arranged so as to define an axially arranged series of rings connected to one another by a plurality of beam-like ligaments.

42. The progressive cavity drive train of claim 37, wherein each intermediate member further comprises a coupling end assembly at each end of the intermediate member for coupling the torque transmitting portion and the thrust transmitting portion to the respective stub shafts.

43. The progressive cavity drive train of claim 37, wherein the thrust transmitting portion comprises an axially arranged series of thrust transmitting members, each member having two transmitting surfaces and each such surface being in contact with another transmitting surface so as to define an axially arranged series of contacting surfaces, at least one surface of each pair of contacting surfaces being curved to permit pivoting movement of the transmitting member relative to one another.

44. The progressive cavity drive train of claim 37, wherein the torque transmitting portion comprises a series of axially arranged rings directly connected to one another.

* * * * *